(12) United States Patent
Saguchi et al.

(10) Patent No.: US 8,592,084 B2
(45) Date of Patent: Nov. 26, 2013

(54) NEGATIVE ELECTRODE FOR ALKALINE SECONDARY CELL AND ALKALINE SECONDARY CELL USING SAME

(75) Inventors: Akira Saguchi, Takasaki (JP); Masaru Kihara, Takasaki (JP); Takahiro Endo, Takasaki (JP)

(73) Assignee: FDK Twicell Co., Ltd., Takasaki-Shi (JP)

( * ) Notice: Subject to any disclaimer, the term of this patent is extended or adjusted under 35 U.S.C. 154(b) by 0 days.

(21) Appl. No.: 13/330,503

(22) Filed: Dec. 19, 2011

(65) Prior Publication Data

US 2012/0164527 A1 Jun. 28, 2012

(30) Foreign Application Priority Data

Dec. 24, 2010 (JP) ................... 2010-287458

(51) Int. Cl.
 *H01M 4/13* (2010.01)
 *H01M 4/24* (2006.01)
 *H01M 6/04* (2006.01)

(52) U.S. Cl.
 USPC ........................................ 429/218.2; 429/206

(58) Field of Classification Search
 None
 See application file for complete search history.

(56) References Cited

U.S. PATENT DOCUMENTS

| 4,252,877 A | 2/1981 | Bowser |
| 5,401,590 A * | 3/1995 | Chalilpoyil et al. ............ 429/59 |
| 2009/0042072 A1* | 2/2009 | Vu et al. ........................ 429/21 |
| 2010/0203385 A1* | 8/2010 | Magari et al. .............. 429/218.2 |

FOREIGN PATENT DOCUMENTS

| JP | 05-159799 A | 6/1993 |
| JP | 09-097605 A | 4/1997 |
| JP | 2009-206004 A | 9/2009 |

OTHER PUBLICATIONS

Extended European Search Report for European Patent Application No. 11195813.8, dated Apr. 12, 2012.

* cited by examiner

*Primary Examiner* — Melvin C Mayes
*Assistant Examiner* — Colin W Slifka
(74) *Attorney, Agent, or Firm* — Marshall, Gerstein & Borun LLP

(57) ABSTRACT

An alkaline secondary cell has an electrode assembly including a positive electrode, a negative electrode and a separator, and alkaline electrolyte. The negative electrode includes hydrogen-storage alloy and an oxidation inhibitor that inhibits the hydrogen-storage alloy from being oxidized. The oxidation inhibitor contains a chemical compound, and the chemical compound includes a chemical-bond-formation end that is chemically bonded to the surface of the hydrogen-storage alloy and a water-repellent end having water repellency.

5 Claims, 1 Drawing Sheet

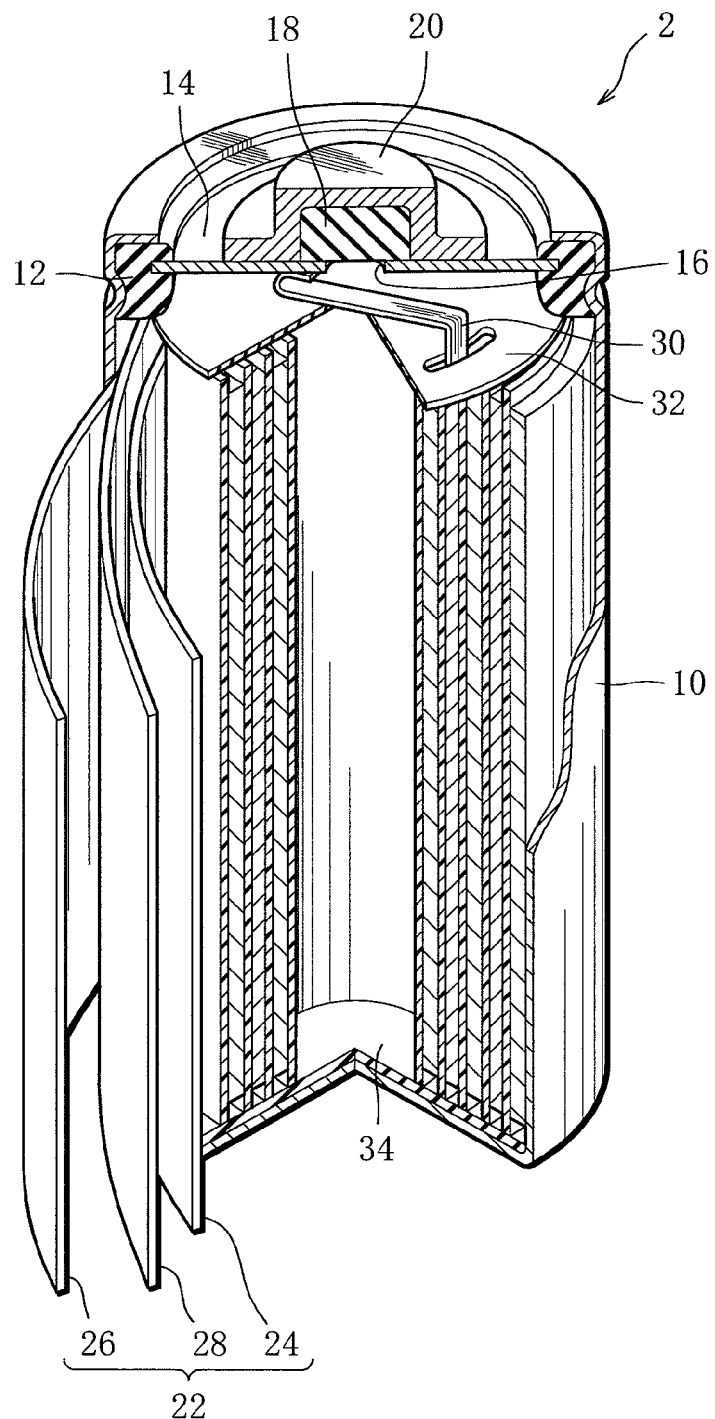

NEGATIVE ELECTRODE FOR ALKALINE SECONDARY CELL AND ALKALINE SECONDARY CELL USING SAME

BACKGROUND OF THE INVENTION

1. Field of the Invention

The present invention relates to a negative electrode for an alkaline secondary cell and an alkaline secondary cell using this negative electrode.

2. Description of the Related Art

One of well-known alkaline secondary cells is a nickel-hydrogen secondary cell. The nickel-hydrogen secondary cell has a higher capacity than a nickel-cadmium secondary cell and is environmentally safe. For these reasons, the nickel-hydrogen secondary cell offers versatile applications in a variety of portable devices, electric hybrid cars, etc. Because of its versatility, the nickel-hydrogen secondary cell is required to be improved in properties including a cycle life property.

A nickel-hydrogen secondary cell that is known for an improved cycle life property is the one disclosed, for example, in Patent Document 1 (Unexamined Japanese Patent Publication (Kokai) No. 2009-206004). This nickel-hydrogen secondary cell contains water-repellent fluorine oil in the negative electrode containing hydrogen-storage alloy. The fluorine oil is partially applied onto the surface of the hydrogen-storage alloy and moderately limits contact between the hydrogen-storage alloy and alkaline electrolyte. This prevents the hydrogen-storage alloy from being deteriorated due to oxidation caused by the alkaline electrolyte when the nickel-hydrogen secondary cell containing fluorine oil is repeatedly charged and discharged. The nickel-hydrogen secondary cell of Patent Document 1 is thus improved in cycle life property.

The fluorine oil is mixed and kneaded with hydrogen-storage alloy powder, a conducting agent, etc., in a process of producing negative slurry. Over the course of the kneading process, the fluorine oil adheres to the surface of the hydrogen-storage alloy.

The fluorine oil simply physically adheres to the surface of the hydrogen-storage alloy and is therefore easy to flow and spread over a relatively wide area of the hydrogen-storage alloy surface during the slurry-kneading process. The fluorine oil consists of water-repellent molecules. For this reason, a water-repellent film made of the fluorine oil is formed over a relatively wide area of the hydrogen-storage alloy surface. When the hydrogen-storage alloy surface is protected by the film over the relatively wide area, the hydrogen-storage alloy is adequately inhibited from being oxidized. Consequently, a cell containing the hydrogen-storage alloy with the film has an excellent cycle life property.

However, if the hydrogen-storage alloy surface is covered with fluorine oil over a wide area, the hydrogen-storage alloy is limited more than necessary in contact with the alkaline electrolyte. In the nickel-hydrogen secondary cell containing the hydrogen-storage alloy that is limited in contact with the alkaline electrolyte, cell reaction is not promoted especially under a low-temperature environment. On this account, conventional nickel-hydrogen secondary cells provided with a negative electrode containing fluorine oil are noticeably degraded in discharge property under a low-temperature environment (hereinafter, referred to as a low-temperature discharge property). One idea for improving the low-temperature discharge property of the conventional nickel-hydrogen secondary cells is to reduce the additive amount of fluorine oil. This, however, shortens the cycle life of the cells.

As seen above, in respect of the conventional nickel-hydrogen secondary cells, the low-temperature discharge property has to be sacrificed in some measure to enhance the cycle life property. On the other hand, in order to enhance the low-temperature discharge property, the cycle life property needs to be sacrificed to some extent. In other words, it is difficult to achieve a balance between the enhancement of the cycle life property and that of the low-temperature discharge property of the cells.

SUMMARY OF THE INVENTION

An aspect of the present invention is directed to a negative electrode for an alkaline secondary cell, comprising: hydrogen-storage alloy and an oxidation inhibitor that inhibits the hydrogen-storage alloy from being oxidized; the oxidation inhibitor contains a chemical compound, and the chemical compound includes a chemical-bond-formation end that is chemically bonded to the surface of the hydrogen-storage alloy and a water-repellent end having water repellency.

BRIEF DESCRIPTION OF THE DRAWING

The present invention will become more fully understood from the detailed description given hereinbelow and the accompanying drawings which are given by way of illustration only, and thus, are not limitative of the present invention, and wherein:

FIG. 1 is a partially cutaway perspective view showing a nickel-hydrogen secondary cell according to one embodiment of the invention.

DETAILED DESCRIPTION OF THE INVENTION

A nickel hydrogen secondary cell (hereinafter, referred to as a cell) equipped with a negative electrode of the invention will be described below in detail.

FIG. 1 shows a cylindrical cell 2, for example, of AA size.

The cell 2 includes a bottomed-cylindrical external can 10, whose top is formed into an open end. The external can 10 includes a conductive bottom wall that functions as a negative terminal. A disc-shaped lid plate 14 is placed at the top of the external can 10 with a ring-shaped insulating packing 12 intervening therebetween. The lid plate 14 has a conductive property. The lid plate 14 and the insulating packing 12 are fixed to the open end of the external can 10 by swaging a rim of the open end of the external can 10.

The lid plate 14 has a gas-vent hole 16 in the center thereof. A rubber valve element 18 is placed on an outer face of the lid plate 14. The valve element 18 blocks the gas-vent hole 16. Furthermore, a cylindrical flanged positive terminal 20 is fixed onto the outer face of the lid plate 14. The positive terminal 20 covers and presses the valve element 18 towards the lid plate 14. The external can 10 is usually closed airtight by the lid plate 14 through the insulating packing 12 and the valve element 18. When gas generates within the external can 10, increasing the inner pressure of the external can 10, the valve element 18 is compressed by the inner pressure and opens the gas-vent hole 16. As a result, the gas in the external can 10 is released from the external can 10 through the gas-vent hole 16. In short, the lid plate 14, the gas-vent hole 16, the valve element 18 and the positive terminal 20 form a relief valve for the cell.

The external can 10 contains an electrode assembly 22. The electrode assembly 22 includes a positive electrode 24, a negative electrode 26 and a separator 28, each having a band-like shape. The positive electrode 24, the negative electrode 26 and the separator 28 are rolled so that the separator 28 is sandwiched between the positive electrode 24 and the negative electrode 26. That is, the positive electrode 24 and the negative electrode 26 are fit together with the separator 28 intervening therebetween. The outermost periphery of the electrode assembly 22 is formed of a part (outermost peripheral portion) of the negative electrode 26. The negative electrode 26 and the external can 10 are electrically connected to each other by the outermost peripheral portion of the negative electrode 26 being in contact with an inner wall of the external can 10.

The external can 10 contains a positive lead 30. The positive lead 30 is set between one end of the electrode assembly 22 and the lid plate 14. Both ends of the positive lead 30 are connected to an inner end of the positive electrode 24 and the lid plate 14, respectively. The positive electrode 24 is electrically connected to the positive terminal 20 of the lid plate 14 through the positive lead 30. Between the lid plate 14 and the electrode assembly 22, there is disposed a circular insulating member 32. The insulating member 32 has a slit that allows the positive lead 30 to pass therethrough. The positive lead 30 accordingly extends through the slit. Furthermore, a circular insulating member 34 is disposed between the electrode assembly 22 and the bottom wall of the external can 10.

The external can 10 is filled with a predetermined amount of alkaline electrolyte, not shown. A charge/discharge reaction between the positive electrode 24 and the negative electrode 26 progresses using the alkaline electrolyte absorbed in the positive electrode 24, the negative electrode 26 and the separator 28. The alkaline electrolyte is not limited in kind. For instance, the alkaline electrolyte may be aqueous sodium hydroxide, aqueous lithium hydroxide, aqueous potassium hydroxide, a solution in which two or more of the above aqueous solutions are mixed, or the like. The alkaline electrolyte is also not limited in concentration. For example, alkaline electrolyte of 8N (normality) may be used.

The separator 28 may be made, for example, of polyamide-fiber nonwoven fabric or polyolefin-fiber nonwoven fabric, such as polyethylene and polypropylene, which is provided with a hydrophilic functional group.

The positive electrode 24 includes a conductive positive electrode substrate having a porous structure and a positive mixture held in holes of the positive electrode substrate.

To fabricate the positive electrode substrate mentioned above, for example, a nickel-plated metal body in the form of mesh, sponge or fiber may be utilized.

The positive mixture includes positive electrode active material particles, a conducting agent and a binding agent. The binding agent functions to bind the positive electrode active material particles and the conducting agent together and bind the positive mixture to the positive electrode substrate.

The positive electrode active material particles are nickel hydroxide particles or high-order nickel hydroxide particles. These nickel hydroxide particles may be ones in which cobalt, zinc, cadmium and the like are solved.

As the conducting agent, for example, one or more elements selected from cobalt compounds including cobalt oxide (CoO), cobalt hydroxide (Co(OH)$_2$), etc., and cobalt (Co) may be used. This conducting agent is contained in the positive mixture if desired. The conducting agent may be added into the positive mixture in the form of powder or included in the positive mixture in the form of a film that covers the surface of the positive electrode active material.

The binding agent of the positive mixture may be, for example, carboxymethylcellulose, methylcellulose, PTFE (polytetrafluoroethylene) dispersion, HPC (hydroxypropyl-cellulose) dispersion or the like.

The positive electrode 24 can be fabricated, for example, in the following manner.

First, positive slurry is prepared, which contains positive electrode active material powder consisting of nickel hydroxide particles, water, a conducting agent and a binding agent. The positive slurry is absorbed into a nickel metal body, for example, in the form of sponge, and is then dehydrated. After the positive slurry is dehydrated, the metal body filled with the nickel hydroxide particles or the like is subjected to rolling and cutting, to thereby fabricate the positive electrode 24.

The negative electrode 26 includes a conductive negative electrode substrate (base material). The negative electrode substrate carries negative mixture.

The negative electrode substrate is formed of a metal sheet. There are a large number of through-holes distributed in the metal sheet. To be specific, the negative electrode substrate may be formed, for example, of a punching metal sheet or a sintered sheet made from metal powder. The sintered sheet is obtained by molding metal powder into a sheet and sintering this sheet. The negative mixture includes portions poured into the through-holes of the negative electrode substrate and portions thoroughly covering both sides of the negative electrode substrate.

The negative mixture contains hydrogen-storage alloy particles capable of storing and discharging hydrogen serving as negative active material, an oxidation inhibitor that inhibits the hydrogen-storage alloy particles from being oxidized by alkaline electrolyte, a conducting agent and a binding agent. It is possible to use a hydrophilic or hydrophobic polymer or the like as the binding agent. As the conducting agent, it is possible to use graphite, carbon black, ketjen black, etc.

Although there is no particular limitation to the hydrogen-storage alloy of the hydrogen-storage alloy particles, the invention uses a rare earth-Mg—Ni-based hydrogen-storage alloy. The composition of the rare earth-Mg—Ni-based hydrogen-storage alloy can be arbitrarily determined. It is preferable to use composition represented by the following general formula:

$$Ln_{1-x}Mg_xNi_{y-a-b}Al_aM_b \qquad (1)$$

In the general formula (1), Ln is at least one element selected from a group consisting of La, Ce, Pr, Nd, Pm, Sm, Eu, Gd, Tb, Dy, Ho, Er, Tm, Yb, Lu, Sc, Y, Zr and Ti. M is at least one element selected from a group consisting of V, Nb, Ta, Cr, Mo, Mn, Fe, Co, Ga, Zn, Sn, In, Cu, Si, P and B. Subscripts a, b, x and y are numbers that satisfy $0.05 \leq a \leq 0.30$, $0 \leq b \leq 0.50$, $0.05 \leq x \leq 0.30$ and $2.8 \leq y \leq 3.9$.

Depending upon composition, the hydrogen-storage alloy expressed by the general formula (1) has a crystal structure of CaCu$_5$-, Ce$_2$Ni$_7$- or Ce$_2$Ni$_7$-type or any one of CaCu$_5$-, Ce$_2$Ni$_7$- and Ce$_2$Ni$_7$-related crystal structures. Preferably, however, the hydrogen-storage alloy has a composition that offers the Ce$_2$Ni$_7$-type crystal structure. This is because alloy with the Ce$_2$Ni$_7$-type crystal structure behaves differently from one with the CaCu$_5$-type crystal structure in terms of pulverization. Pulverization is less likely to occur in the alloy with the Ce$_2$Ni$_7$-type crystal structure than in the one with the CaCu$_5$-type crystal structure. Pulverization creates new faces in the hydrogen-storage alloy, on which there is no oxidation inhibitor, reducing an oxidation-inhibiting effect of the oxidation inhibitor. On the other hand, the hydrogen-storage alloy is resistant to pulverization and can retain a relative percentage of area in which the oxidation inhibitor exists. It is then possible to inhibit the oxidation of the hydrogen-storage alloy for a long period of time.

The hydrogen-storage alloy particles can be obtained, for example, in the following manner.

First of all, metal raw materials of respective compositions included in the hydrogen-storage alloy are prepared. The metal raw materials of the respective compositions are so measured as to account for predetermined percentages. The metal raw materials that have been measured are mixed together, and a mixture of the metal raw materials is obtained. The obtained mixture is melted, for example, in an induction melting furnace and is turned into ingot. This ingot is heated in an inert gas atmosphere at a temperature of 900 to 1200° C. for 5 to 24 hours. This heat treatment homogenizes the ingot. Thereafter, the ingot is pulverized into particles, which are sieved and sorted. In this way, the hydrogen-storage alloy particles with desired particle diameter are obtained. In general, a hydroxide layer is formed on the surface of the hydrogen-storage alloy.

The oxidation inhibitor will be described below.

The oxidation inhibitor is a chemical compound having a chemical structure including a chemical-bond-formation end that is chemically bonded to the surface of the hydrogen-storage alloy and a water-repellent end that has water repellency. One of such compounds is a phosphate ester fluorine compound having a phosphoester group at the chemical-bond-formation end and a fluorocarbon chain at the water-repellent end. The phosphate ester fluorine compound has a chemical structure in which the phosphoester group exists at an end, and the fluorocarbon chain exists at an opposite end to the phosphoester group. The following detailed description refers to the operation of the phosphate ester fluorine compound.

At the time of adding water into hydrogen-storage alloy powder and the like to prepare negative slurry, the above-mentioned phosphate ester fluorine compound is added together. The phosphoester group in the phosphate ester fluorine compound is hydrolyzed and dehydrates a hydroxyl group of a hydroxide layer and a hydroxyl group of phosphoric acid on the hydrogen-storage alloy surface. As a result, the hydrogen-storage alloy and phosphorus form a chemical bond by using oxygen. The phosphoester group in the phosphate ester fluorine compound is then bonded to the hydrogen-storage alloy surface. The phosphate ester fluorine compound has the water-repellent fluorocarbon chain at the opposite end to the phosphoester group. Accordingly, a water-repellent layer made of the fluorocarbon chain is fixed to the hydrogen-storage alloy surface through the phosphoester group. The water-repellent layer limits contact between the alkaline electrolyte and the hydrogen-storage alloy and inhibits the oxidation of the hydrogen-storage alloy. The cell including the negative electrode of the invention is therefore improved in cycle life property. Fixed to the hydrogen-storage alloy surface by the firm and stable chemical bond using the phosphoester group, the water-repellent layer does not spread to other places than where this chemical bond is formed. For that reason, unlike a water-repellent film made of fluorine oil which merely physically adheres to the hydrogen-storage alloy surface, the water-repellent layer does not spread over a wide area of the hydrogen-storage alloy surface. The negative electrode of the cell according to the invention then makes it possible to keep the area in which the hydrogen-storage alloy surface is covered with the water-repellent layer to the minimum for retaining a given cycle life property. That is to say, contact area between the alkaline electrolyte and the hydrogen-storage alloy, which are required for cell reaction, is not reduced more than necessary. The cell of the invention can advance a predetermined cell reaction even under a low-temperature environment. The negative electrode for an alkaline secondary cell and the alkaline secondary cell with this negative electrode according to the invention are capable of increasing the cycle life without deteriorating the low-temperature discharge property of the cell, and are of significant industrial value.

The negative electrode 26 can be fabricated, for example, in the following manner. First, hydrogen-storage alloy powder consisting of hydrogen-storage alloy particles, an oxidation inhibitor, a conducting agent, a binding agent and water are mixed and kneaded into negative slurry. The obtained negative slurry is applied onto a negative electrode substrate and dehydrated. After the negative slurry is dehydrated, the negative electrode substrate attached with negative mixture including hydrogen-storage alloy particles and the like is subjected to rolling and cutting, to thereby obtain the negative electrode 26.

EMBODIMENTS

1. Cell Production

Embodiment 1

(1) Fabrication of a Positive Electrode

Nickel hydroxide powder containing zinc of 2.5 percent by mass and cobalt of 1.0 percent by mass was put into a cobalt sulfate solution. A sodium hydroxide solution of 1 mol/l was delivered by drops into the cobalt sulfate solution that was being stirred, to thereby make the sodium hydroxide solution react with the cobalt sulfate solution. In this process, sediments consisting of sodium hydroxide particles were produced while pH was maintained at 11 during the reaction. The produced sediments were separated by filtration, rinsed with water and then subjected to vacuum dehydration treatment. Nickel hydroxide powder was obtained by this means. The surfaces of the nickel hydroxide particles making up the nickel hydroxide powder were covered with cobalt hydroxide of 5 percent by mass.

The obtained nickel hydroxide powder was put into a sodium hydroxide solution of 25 percent by mass. A mass ratio of the nickel hydroxide powder to the sodium hydroxide solution was set to be 1 to 10. The sodium hydroxide solution containing the nickel hydroxide powder underwent heat treatment in which the solution was stirred in atmosphere at a temperature of 85° C. for 8 hours.

After the heat treatment, the nickel hydroxide powder was rinsed with water and subjected to dehydration treatment at a temperature of 65° C. The nickel hydroxide powder subjected to the heat treatment and the dehydration treatment will be hereinafter referred to as nickel positive electrode active material powder. The surfaces of nickel hydroxide particles making up the nickel positive electrode active material powder were covered with high-order cobalt oxide.

The obtained nickel positive electrode active material powder of 95 percent by mass was mixed with zinc oxide of 3 percent by mass and cobalt hydroxide of 2 percent by mass, whereby mixed powder was prepared. The mixed powder was then mixed with a hydroxypropylcellulose solution of 0.2 percent by mass, to thereby produce positive slurry. To produce the positive slurry, the hydroxypropylcellulose solution was added to constitute 50 percent by mass of the mixed powder.

The positive slurry was injected into a nickel foam having a surface density (density) of about 600 g/m$^2$, a porosity of 95 percent, and a thickness of about 2 mm. The positive slurry then underwent dehydration treatment. After the slurry was dehydrated, the nickel foam was subjected to rolling and was cut into predetermined size. By this means, the positive electrode 24 formed of a non-sintered nickel electrode was obtained. The above-mentioned rolling process was performed with adjustment such that the positive electrode active material had a density of about 2.9 g/cm$^3$-void.

(2) Fabrication of a Negative Electrode

As metal raw materials, Nd, Sm, Mg, Ni and Al were prepared. The prepared metal raw materials were mixed together so that a predetermined molar ratio was established, and were thus turned into a metal-raw-material mixture. This mixture was melted in an induction melting furnace and was subsequently refrigerated into ingot.

The ingot was homogenized by heat treatment in which the ingot was heated in an argon atmosphere at a temperature of 1000° C. for 10 hours. The ingot subjected to the heat treatment was mechanically pulverized in an argon gas atmosphere and thus formed into rare earth-Mg—Ni-based hydrogen-storage alloy powder. As to particle size distribution of the hydrogen-storage alloy particles obtained by the above pulverization, average particle size is 65 μm, which corresponds to a weight integration of 50 percent.

The composition of the obtained hydrogen-storage alloy powder was analyzed by high-frequency plasma spectroscopic analysis (ICP). The result of the analysis showed that the obtained hydrogen-storage alloy had a composition of $Nd_{0.36}Sm_{0.54}Mg_{0.10}Ni_{3.33}Al_{0.17}$. A crystal structure of the hydrogen-storage alloy was specified by X-ray diffraction measurement (XRD measurement). The crystal structure of the obtained hydrogen-storage alloy was of $Ce_2Ni_7$-type.

A mixture was produced by a process in which 100 parts by mass of the obtained hydrogen-storage alloy powder was added with 0.2 parts by mass of sodium polyacrylate, 0.2 parts by mass of carboxymethylcellulose, 0.5 parts by mass (solid conversion) of dispersion (50 percent by mass in solid content) of styrene-butadiene copolymer rubber (SBR), 0.5 parts by mass of ketjen black, 50 parts by mass of water, and 0.1 parts by mass in solid content of phosphate ester fluorine compound. This mixture was kneaded at normal temperature, and negative slurry was thus obtained.

The negative slurry was evenly applied onto both sides of a perforated iron board serving as a negative electrode substrate so as to spread evenly and have uniform thickness. The perforated board had a thickness of 60 μm and had a nickel-plated surface.

After the slurry was dehydrated, the perforated board attached with the hydrogen-storage alloy powder was subjected to rolling and cutting into the negative electrode 26 for an AA-size cell.

(3) Assembly of a Nickel-Hydrogen Secondary Cell

The positive electrode 24 and the negative electrode 26 obtained as described above were rolled with the separator 28 sandwiched therebetween, to thereby form the electrode assembly 22. The separator 28 used here was made of polypropylene-fiber nonwoven fabric and had a thickness of 0.1 mm (40 g/m$^2$ in density).

After the electrode assembly 22 was put into the bottomed cylindrical-external can 10, the external can 10 was filled with 2.2 grams of alkaline electrolyte (KOH:NaOH:LiOH=15:2:1 in a weight mixing ratio; 1.30 in gravity). The open end of the external can 10 was then closed with the lid plate 14 and the like. This is how the sealed nickel hydrogen secondary battery 2 of AA size shown in FIG. 1 was assembled. A nominal capacity of the cell 2 was 1500 mAh. The nickel hydrogen secondary cell of Embodiment 1 will be hereinafter referred to as a cell A.

Embodiment 1

A nickel hydrogen secondary cell (cell B) was assembled in the same manner as the cell A of Embodiment 1, apart from adding, as fluorine oil, 0.1 parts by mass of chlorotrifluoroethylene polymer (1000 in average molecular weight, 900 cSt in kinetic viscosity (25° C.)), instead of phosphate ester fluorine compound, and kneading negative slurry so that the chlorotrifluoroethylene polymer was fully dispersed.

Comparative Example 2

A nickel hydrogen secondary cell (cell C) was assembled in the same manner as the cell A of Embodiment 1, apart from not adding phosphate ester fluorine compound.

2. Test of Nickel Hydrogen Secondary Cells (1) Initial Activation Treatment

As initial activation treatment of the cells A to C, a charge-and-discharge cycle was repeated three times for each cell, which includes an operation in which the cells were charged at a temperature of 25° C. with a charge current of 150 mA for 16 hours and then were discharged with a discharge current 1500 mA until cell voltage reaches 1.0 V.

(2) Cycle Life Property Test

The cells A to C subjected to the initial activation treatment underwent charge treatment in which the cells A to C were charged in atmosphere at a temperature of 25° C. with a charge current of 1500 mA. This charge treatment started after the cell voltage reached a maximum value, and continued until the cell voltage dropped 10 mV from the maximum value. Thereafter, the cells were left to stand for 30 minutes.

After being left to stand, the cells underwent discharge treatment in which the cells were discharged in the same atmosphere with a discharge current of 1500 mA until the cell voltage reached 1.0 V. The cells were then left to stand for 30 minutes.

The above-described charge and discharge treatments including the 30-minute unattended state were defined as one cycle. This charge-and-discharge treatment was repeated until the discharge capacities of the cells dropped from 1500 mAh to 1000 mAh. The number of cycles was counted, which were required for each cell to reach a discharge capacity of 1000 mAh. This number of cycles was regarded as cycle life. The number of cycles at the time point when the cell C of Comparative Example 2 reached the cycle life was defined as 100. On this basis, a ratio between the cycle life of the cell C and that of each of the other cells was obtained. Results are shown in TABLE 1 under the cycle life property ratio.

(3) Low-Temperature Discharge Property Test 1

The cells A to C subjected to the initial activation treatment underwent charge treatment in which the cells A to C were charged with a charge current of 1500 mA. This charge treatment started after the cell voltage reached a maximum value, and continued until the cell voltage dropped 10 mV from the maximum value. Thereafter, the cells were left to stand in a low-temperature atmosphere at a temperature of −10° C. for 3 hours.

The cells underwent discharge treatment in which the cells were discharged in the same low-temperature atmosphere with a discharge current of 1500 mA until the cell voltage reached 1.0 V. The cells were then left to stand for 30 minutes.

At this time point, the discharge capacities of the cells were measured. The discharge capacity of the cell C of Comparative Example 2 was defined as 100. On this basis, a ratio between the discharge capacity of the cell C and that of each of the other cells was obtained. Results are shown in TABLE 1 under the low-temperature discharge property ratio 1.

(4) Low-Temperature Discharge Property Test 2

The test was conducted in the same manner as the low-temperature discharge property test 1, apart from setting at −20° C. the atmosphere temperature during the unattended state after the discharge treatment and the atmosphere temperature during discharge. Discharge capacity was measured with respect to each cell. The discharge capacity of the cell C of Comparative Example 2 was defined as 100. On this basis, a ratio between the discharge capacity of the cell C and that of each of the other cells was obtained. Results are shown in TABLE 1 under the low-temperature discharge property ratio 2.

TABLE 1

| | Additives for the negative electrode | Cycle life property ratio | Low-temperature discharge property ratio 1 (−10° C.) | Low-temperature discharge property ratio 2 (−20° C.) |
| --- | --- | --- | --- | --- |
| Embodiment 1 (Cell A) | Phosphate ester fluorine compound | 120 | 98 | 85 |
| Comparative Example 1 (Cell B) | Fluorine oil | 120 | 89 | 3 |
| Comparative Example 2 (Cell C) | Nil | 100 | 100 | 100 |

3. Test Results

TABLE 1 shows the following matters.

(1) The cell A of Embodiment 1 in which the phosphate ester fluorine compound serving as a water-repellent additive is added to the negative electrode and the cell B of Comparative Example 1 in which the fluorine oil serving as a water-repellent additive is added to the negative electrode have higher cycle life property ratios than the cell C of Comparative Example 2 which is not added with a water-repellent additive.

A possible reason for this is that the water-repellent additive covers the surface of the hydrogen-storage alloy, limits contact between the hydrogen-storage alloy and the alkaline electrolyte, and thus inhibits the hydrogen-storage alloy from being oxidized.

(2) The cell A of Embodiment 1 which is added with the phosphate ester fluorine compound has a higher low-temperature discharge property ratio than the cell B of Comparative Example 1 which is added with the fluorine oil. In the low-temperature atmosphere at a temperature of −20° C., the cell A of Embodiment 1 maintains the low-temperature discharge property at a high level, whereas the cell B of Comparative Example 1 is noticeably deteriorated in low-temperature discharge property.

This is because the fluorine oil according to Comparative Example 1 simply physically adheres to the hydrogen-storage alloy surface and easily spreads over a relatively wide area. In the hydrogen-storage alloy surface according to Comparative Example 1, the area that is covered with the water-repellent fluorine oil is considered to be relatively large. It can be said that, in the cell B, contact between the alkaline electrolyte and the hydrogen-storage alloy is limited more than necessary, and the cell reaction in the low-temperature atmosphere is not promoted.

In contrast to this, as to the phosphate ester fluorine compound of Embodiment 1, the phosphoester group is chemically bonded to the hydrogen-storage alloy in a firm and stable manner. The phosphate ester fluorine compound accordingly does not spread over and adhere to a wide area in the hydrogen-storage alloy surface. Because of this, the water-repellent fluorocarbon chain located on the opposite side to the phosphoester group is fixed to a predetermined place on the hydrogen-storage alloy surface. It can be considered that, for the above reason, the area of the hydrogen-storage alloy surface, which is covered with the water-repellant layer, is kept to the minimum area for inhibiting the oxidation of the hydrogen-storage alloy. In the cell A, therefore, sufficient contact area that is required for cell reaction between the alkaline electrolyte and the hydrogen-storage alloy is secured. It is contemplated that the cell reaction was promoted in spite of the low-temperature atmosphere.

(3) Consequently, the nickel-hydrogen secondary cell using hydrogen-storage alloy, whose negative electrode is added with the phosphate ester fluorine compound, is capable of preventing deterioration in the low-temperature discharge property and improving the cycle life property.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A negative electrode for an alkaline secondary cell comprising:
   a hydrogen-storage alloy; and
   an oxidation inhibitor compound chemically bound to the hydrogen-storage alloy for inhibiting said hydrogen-storage alloy from being oxidized, wherein the oxidation inhibitor compound has a chemical-bond-formation end for chemically binding to the surface of the hydrogen-storage alloy and a water-repellent end having water repellency,
   wherein the oxidation inhibitor is a phosphate ester fluorine compound and contains a phosphoester group at the chemical-bond-formation end and a fluorocarbon chain at the water-repellent end.

2. The negative electrode according to claim 1, wherein the hydrogen-storage alloy has a composition that is represented by a general formula, $Ln_{1-x}Mg_xNi_{y-a-b}Al_aM_b$;
   in this formula,
   Ln is at least one element selected from a group consisting of La, Ce, Pr, Nd, Pm, Sm, Eu, Gd, Tb, Dy, Ho, Er, Tm, Yb, Lu, Sc, Y, Zr and Ti;
   M is at least one element selected from a group consisting of V, Nb, Ta, Cr, Mo, Mn, Fe, Co, Ga, Zn, Sn, In, Cu, Si, P and B; and
   subscripts a, b, x and y satisfy conditions that $0.05 \le a \le 0.30$, $0 \le b \le 0.50$, $0.05 \le x \le 0.30$, and $2.8 \le y \le 3.9$, respectively.

3. An alkaline secondary cell comprising:
   an electrode assembly, the electrode assembly including a positive electrode, a negative electrode of claim 2, and a separator; and
   alkaline electrolyte.

4. An alkaline secondary cell comprising:
   an electrode assembly, the electrode assembly including a positive electrode, a negative electrode of claim 1, and a separator; and
   alkaline electrolyte.

5. The negative electrode of claim 1, wherein the water-repellent end and the chemical-bond-formation end are oppositely disposed.

* * * * *